United States Patent
Yan

(10) Patent No.: US 7,760,620 B2
(45) Date of Patent: Jul. 20, 2010

(54) METHOD AND APPARATUS FOR PROCESSING FAULT DEPENDENCY OF DIFFERENT LEVELS OF TANDEM CONNECTION MONITORING

(75) Inventor: Jun Yan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 120 days.

(21) Appl. No.: 12/178,283

(22) Filed: Jul. 23, 2008

(65) Prior Publication Data

US 2008/0279548 A1    Nov. 13, 2008

(30) Foreign Application Priority Data

Jan. 23, 2006   (CN)   .................. 2006 1 0033333

(51) Int. Cl.
- H04J 3/14      (2006.01)
- H04L 12/26    (2006.01)
- H04L 12/28    (2006.01)
- G01R 31/08    (2006.01)
- G06F 11/30    (2006.01)
- H04B 10/08    (2006.01)

(52) U.S. Cl. ................. 370/216; 370/242; 370/248; 370/249; 370/250; 370/252; 370/255; 398/2; 398/10; 398/16; 398/17; 398/33

(58) Field of Classification Search ......... 370/216–218, 370/221–224, 242, 248, 249, 250, 252, 254, 370/255; 398/1, 2–4, 9–14, 17–20, 25, 33
See application file for complete search history.

(56) References Cited

U.S. PATENT DOCUMENTS

| 6,938,187 | B2  |  8/2005 | Brissette |
| 7,032,032 | B2* |  4/2006 | Loprieno ................. 709/246 |
| 7,042,847 | B2* |  5/2006 | Gourley et al. ............ 370/242 |
| 7,143,161 | B2* | 11/2006 | Brissette ................... 709/224 |

(Continued)

FOREIGN PATENT DOCUMENTS

CN    1492624 A    4/2004

(Continued)

OTHER PUBLICATIONS

"Interface for the Optical Transport Network (OTN)" ITU_T Standard in Force (I) International Telecommunication Union, Geneva, CH. Mar. 16, 2003.

(Continued)

*Primary Examiner*—Chi H Pham
*Assistant Examiner*—Ahmed Elallam
(74) *Attorney, Agent, or Firm*—Brinks Hofer Gilson & Lione

(57) ABSTRACT

A method for processing fault dependency of different levels of tandem connection monitoring is provided. The method comprises obtaining monitored coverage scopes of the different levels of tandem connection monitoring (TCM); locating a fault section according to an overlapping relationship between monitored coverage scopes of the at least two different levels of TCM at which the warnings are reported and performance degradation degrees of the at least two different levels of TCM, the fault section being located when warnings are reported in at least two different levels of TCM; and outputting location-related information that includes information of the fault section to a user.

12 Claims, 5 Drawing Sheets

U.S. PATENT DOCUMENTS

| | | |
|---|---|---|
| 2003/0120799 A1 | 6/2003 | Lahav et al. |
| 2004/0066750 A1* | 4/2004 | Carson et al. ............... 370/250 |
| 2004/0184489 A1 | 9/2004 | Brissette et al. |
| 2005/0013241 A1* | 1/2005 | Beller et al. ............... 370/216 |
| 2005/0078607 A1* | 4/2005 | Bellato et al. ............... 370/248 |
| 2005/0086555 A1 | 4/2005 | Langridge |
| 2006/0126503 A1* | 6/2006 | Huck et al. ............... 370/225 |
| 2009/0202239 A1* | 8/2009 | Holness et al. ............... 398/33 |

FOREIGN PATENT DOCUMENTS

| | | |
|---|---|---|
| EP | 1 422 968 A1 | 5/2004 |
| WO | 03/044995 A2 | 5/2003 |
| WO | 2004/039004 A1 | 6/2004 |

OTHER PUBLICATIONS

Agilent Technologies. "An Overview of ITU-T G.709" Sep. 1, 2001.
Supplementary European Search Report issued in corresponding EPO Application No. 06 82 8347; mailed Jul. 31, 2009.
International Search Report issued in corresponding PCT Application PCT/CN2006/003433; mailed Mar. 29, 2007.
Office Action issued in corresponding European Patent Application No. 06828347.2; issued Dec. 3, 2009.
Written Opinion of the International Searching Authority; mailed Mar. 29, 2007.
"Characteristics of Optical Transport Network Hierarchy Equipment Functional Blocks" ITU-T-Telecommunication Standardization Sector; Dec. 2006.

* cited by examiner

METHOD AND APPARATUS FOR PROCESSING FAULT DEPENDENCY OF DIFFERENT LEVELS OF TANDEM CONNECTION MONITORING

This application claims priority from Chinese patent application No. 200610033333.X submitted with the State Intellectual Property Office of P.R.C. and entitled "A Method For Processing Fault Dependency Of Different Levels Of Tandem Connection Monitoring", the content of which is incorporated herein by reference.

FIELD

The present embodiments relate to processing fault dependency of different levels of Tandem Connection Monitoring (TCM).

BACKGROUND

An Optical Transport Network (OTN) includes sub-networks of different operators. Each operator owns its own fiber optic and network equipment, and is responsible for the management, maintenance, and fault location of the network equipment within its own sub-network. However, an OTN providing services for users involves interconnection between network equipment of different operators. For example, end-to-end user traffic may pass through the sub-networks of different operators. Therefore, a mechanism for evaluating quality conditions of the sub-networks of different operators is desired.

Currently, a Tandem Connection Monitoring (TCM) method is used to evaluate qualities of the networks of different operators. TCM may implement the monitoring of sub-networks, so that the qualities of the sub-networks of different operators may be evaluated. The quality condition of a part of path transporting the end-to-end traffic may be monitored.

Six levels of TCM overheads are defined in the Optical Data Unit (ODU) layer of OTN. Each TCM includes Trail Trace Identifier (TTI), Bit Interleaved Parity (BIP8) Backward Defect Indicator (BDI), Backward Error Indicator (BEI), Status Field (STAT) and Backward Incoming Alignment Error (BIAE), by which continuity monitoring, connectivity monitoring, and signal quality monitoring may be implemented.

An optical network includes devices and links connecting the devices. When a device or link has a fault, the device sends a warning and reports to a network management unit. An operating personnel analyzes and repairs the fault. In a process of passing through the devices of the network and transmission to the network management unit, warnings may form a warning storm because the warnings contain a large amount of information. The warning storm may consume the communication bandwidth and decrease the operation efficiency. Therefore, a dependency analysis is required for the warning information. The dependency analysis is used to suppress some of the warnings, locate sources of faults quickly, and provide a better guidance to the users to remove the faults.

When establishing an end-to-end service, a user may assign 6 levels of TCM to different sub-networks of different operators, respectively. Different levels of TCM can not influence each other. Each level of TCM monitors signal quality by using its own overhead, and reports the quality condition monitored by itself independently. However, when the network has a fault (or some faults), the fault is reflected on some levels of TCM. Accordingly, warnings may be triggered at different levels of TCM. Each level of TCM involved may report warning information to the user. In this way, the user may receive a large amount of warning information when the network has the fault (faults), and have to take a large amount of time to locate a fault section (fault sections).

SUMMARY

The present embodiments relate to processing warnings of different levels of TCM. For example, in one embodiment, fault location information may be directly provided to a user, which reduces the time for fault location by the user.

In one embodiment, a method for processing fault dependency of different levels of tandem connection monitoring is provided. The method includes: obtaining monitored coverage scopes of the different levels of tandem connection monitoring (TCM); when warnings are reported in at least two different levels of TCM, locating a fault section according to an overlapping relationship between monitored coverage scopes of the at least two different levels of TCM at which the warnings are reported and performance degradation degrees of the at least two different levels of TCM; outputting location-related information, including information of the fault section, to a user.

In one embodiment, an apparatus for processing fault dependency of different levels of tandem connection monitoring (TCM) is provided. The apparatus includes: a TCM information unit, a TCM warning performance receiving unit, a fault section location unit, and an information output unit. The TCM information unit is adapted (operable) to provide information of monitored coverage scopes of different levels of TCM. The TCM warning performance receiving unit is adapted to receive warning information and performance information from the different levels of TCM, and report to a fault section location unit when warnings are reported at least two different levels of TCM. The fault section location unit is adapted to locate a fault section according to an overlapping relationship between monitored coverage scopes of the at least two different levels of TCM, at which warnings are reported, provided by the TCM information unit, and performance degradation degree relationship between the at least two different levels of TCM, at which warnings are reported provided by the TCM warning performance receiving unit. The information output unit, adapted to output location-related information, provided by the fault section location unit, to a user.

The monitored coverage scopes of different levels of TCM are learned. When warnings are reported in at least two different levels of TCM, a fault section may be located according to an overlapping relationship between monitored coverage scopes of the at least two different levels of TCM at which the warnings are reported and performance degradation degrees of the different levels of TCM. Location information of the fault section may be output to a user. When warnings are reported at multiple different levels of TCM, a user may directly obtain the location information of fault section(s), which saves time for fault location.

DETAILED DESCRIPTION

Figure 1:
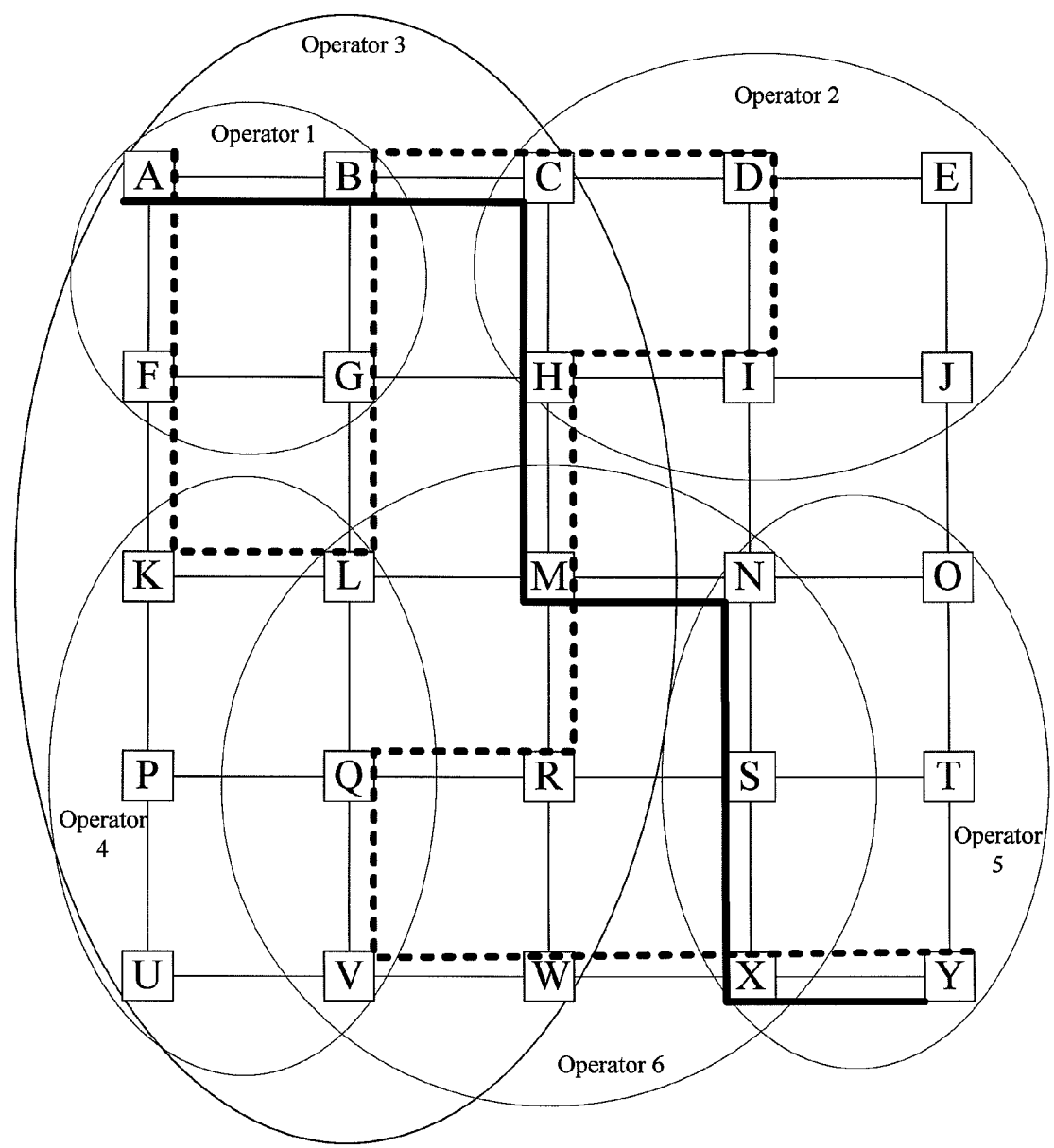
FIG. 1 is a schematic diagram illustrating a mesh networking to which a method for processing fault dependency of different levels of tandem connection monitoring may be applied.

The present embodiments relate to processing warnings of different levels of TCM, which may be implemented in a network including sub-networks (i.e., a plurality of domains) of a plurality of operators. As shown in FIG. 1, a mesh networking having six operators is shown as an example. FIG. 1 shows only an example of one embodiment, the networks are not limited to the mesh networking shown in FIG. 1. For example, the networks may be of a line type networking or a ring type networking.

In FIG. 1, there are 25 nodes (represented by A to Y) formed by sub-networks of 6 operators (i.e. operator 1 to operator 6). The sub-networks of different operators may be overlapping or nested. For example, the sub-networks of operator 3 and operator 1 are nested. The sub-networks of operator 5 and operator 6 are overlapping. No matter whether nested or overlapping, part of the coverage scopes of two networks is overlapped, the remaining part is not overlapped. The relationship between the operators and the nodes is as follows:

Operator 1: ABFG

Operator 2: CDEHIJ

Operator 3: ABCFGHKLMPQRUVW

Operator 4: KLPQUV

Operator 5: NOSTXY

Operator 6: LMNQRSVWX

An optic fiber may connect the nodes. The optic fiber between the nodes, within the sub-network of each operator, belongs to the operator. For example, the fiber between node B and node C and the fiber between node F and node K also belong to operator 1. The fiber between node H and node M also belongs to operator 2. The fiber between node M and node N also belongs to operator 3. The fiber between node V and node W also belongs to operator 4. The fiber between node W and node X also belongs to operator 5.

Figure 2:
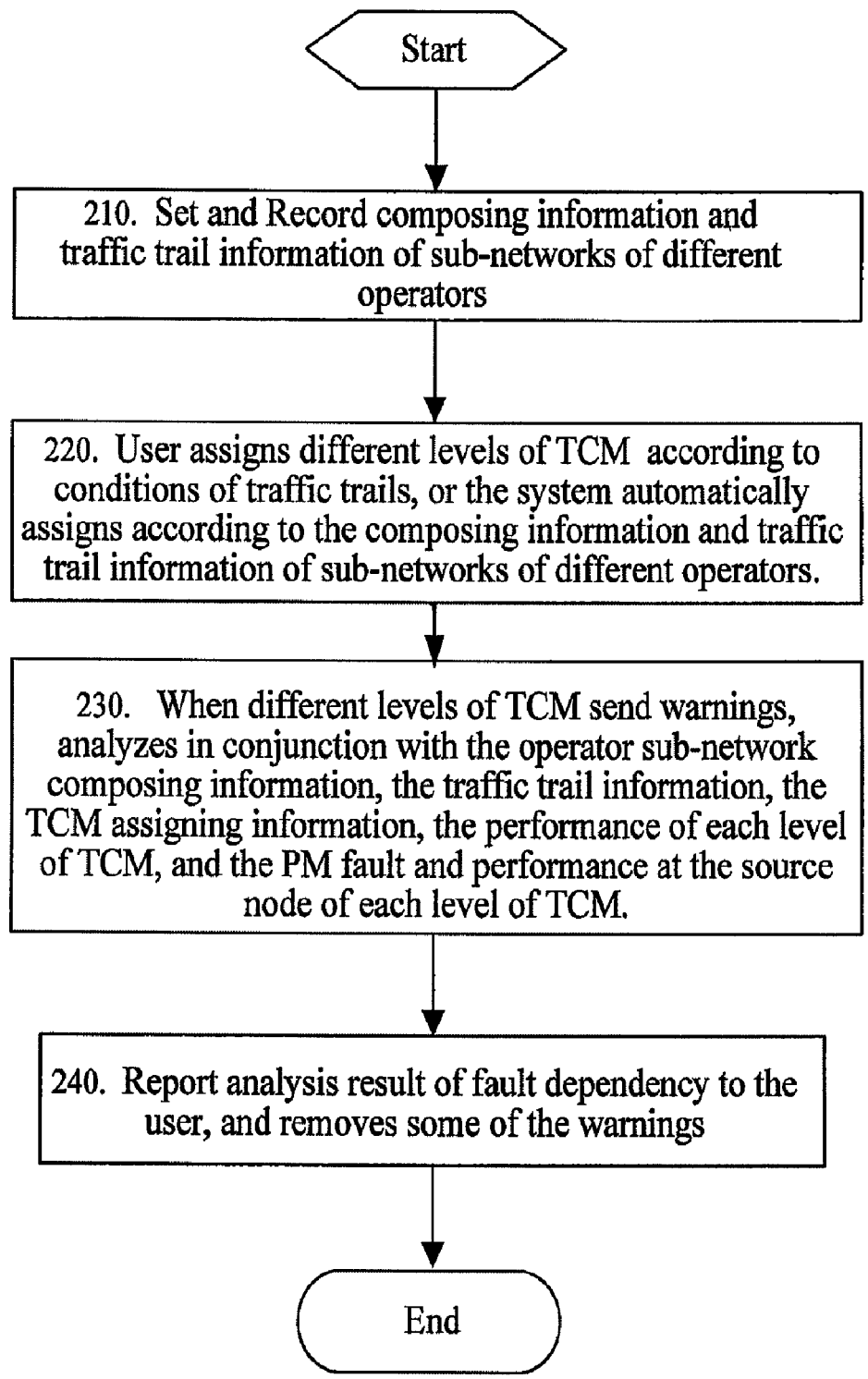
FIG. 2 is a flow chart illustrating a method for processing fault dependency of different levels of tandem connection monitoring.

FIG. 2 is a flow chart illustrating a method for processing warnings of different levels of tandem connection monitoring. Referring to FIG. 2, together with FIG. 1, the method is as follows.

In act 210, composing information and traffic trail information of sub-networks of different operators are set and recorded. For example, an operator sub-network composing table and a traffic assigning table are employed to record information of nodes contained in the sub-networks of the operators, and information of source nodes, intermediate nodes, and sink nodes involved in different traffic.

In FIG. 1, for example, an operator sub-network composing table is configured to record the relationship between each operator and the nodes, as shown in Table 1.

TABLE 1

Operator Sub-network Composing Table

| Operator Identifier | Node identifier list |
|---|---|
| Operator 1 | ABFG |
| Operator 2 | CDEHIJ |
| Operator 3 | ABCFGHKLMPQRUVW |
| Operator 4 | KLPQUV |
| Operator 5 | NOSTXY |
| Operator 6 | LMNQRSVWX |

Supposing a traffic involved in the above network is from source node A to sink node Y, the normal trail of the traffic is represented by a bold solid line shown in FIG. 1. The nodes through which the normal trail passes and the order of the nodes are: ABCHMNSXY. After a repair action, the trail is represented by a bold dashed line, shown in FIG. 1. The nodes through which the trail after a repair action passes and the order of the nodes are: AFKLGBCDIHMRQVWXY.

In addition, a traffic trail table may be configured to record information associated with each type of traffic, as shown in Table 2 below:

TABLE 2

Traffic Trail table

| Traffic identifier | Source node | Intermediate node | Sink node |
|---|---|---|---|
| Traffic 1 (normal) | A | BCHMNSX | Y |
| Traffic 2 (after a repair action) | A | FKLGBCDIHMRQVWX | Y |

In act 220, different levels of TCM are assigned according to different traffic trails. The assigning may be done by a user itself through a network manager, or may be done automatically inside the system according to the conditions of sub-networks of different operators. An example in which the assigning is done automatically inside the system according to the conditions of sub-networks of different operators is described with respect to and illustrated in FIG. 3.

Figure 3:
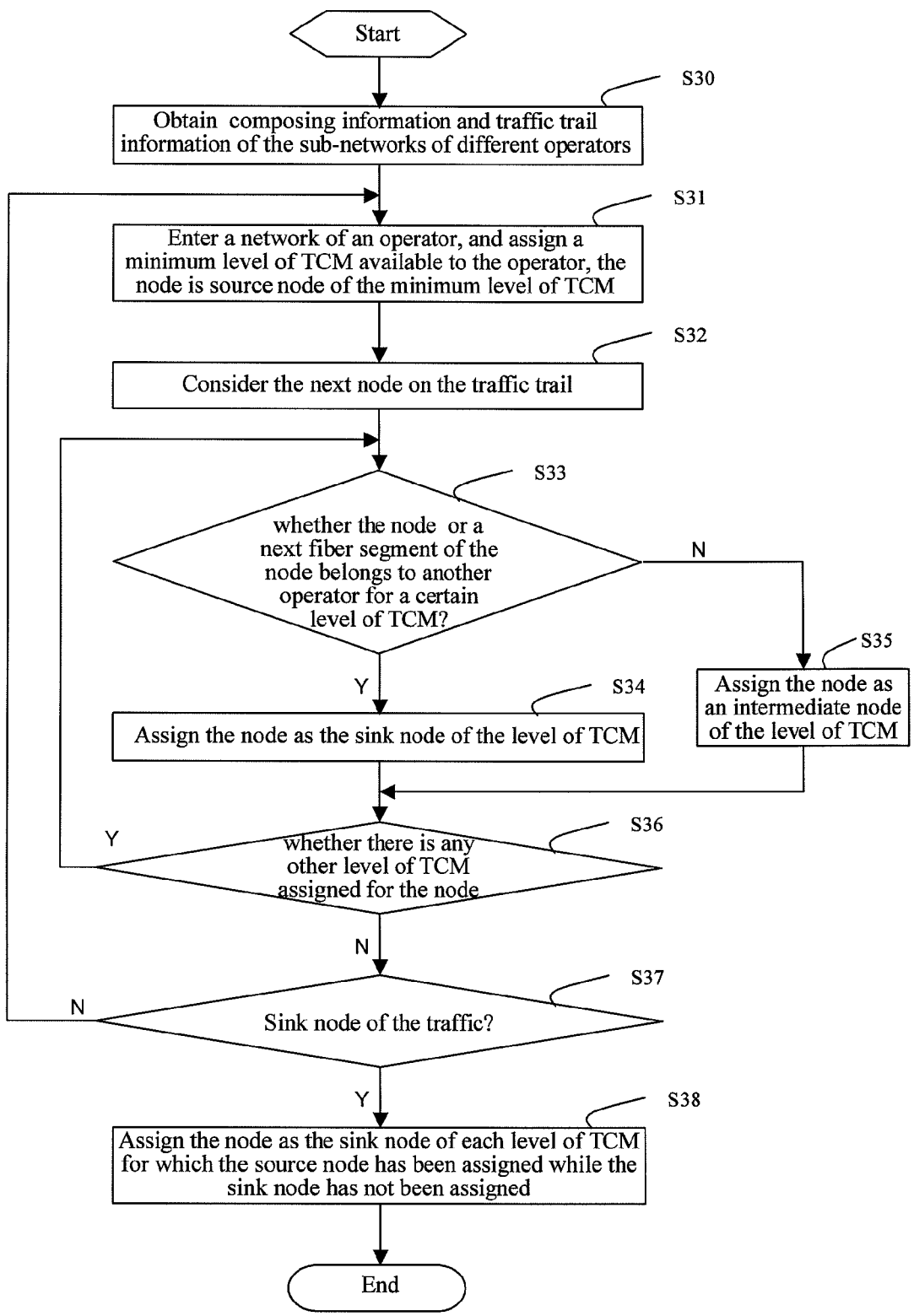
FIG. 3 is a flow chart illustrating a process for automatically assigning TCM, as shown in FIG. 2.

FIG. 3 is a flow chart illustrating a process for automatically assigning TCM by the system as shown in FIG. 2. Referring to FIG. 3, and supposing the traffic is Traffic 1 (normal), as shown in Table 2, the automatic assigning process is as follows.

In act S30, composing information and traffic trail information of the sub-networks of different operators are learned, to know to which operator the fiber between each pair of nodes belongs. The process may proceed to act S31.

In act S31, a network of an operator is entered, and a minimum level of TCM available is assigned to be applied to the operator, a node at which the traffic enters the network is set as the source node of this minimum level of TCM. As shown in Table 2, the traffic enters the sub-networks of operator 1 and operator 3 from source node A. TCM1 (supposing TCM1 is the minimum level of TCM available) is assigned to be applied to operator 1. Node A serves as the source node of TCM1. TCM 2 is assigned to be applied to operator 3. Node A also serves as the source node of TCM2. The process may proceed to act S32.

In act S32, a next node on the traffic trail is determined. In this example, the next node of node A for traffic 1 is node B as shown in Table 2.

In act S33, it is judged (determined) whether the node (i.e. the next node mentioned in act S32) or a next fiber segment of the node belongs to another operator for a certain level of TCM. For example, it is judged (determined) whether node B or the next fiber segment of node B belongs to another operator.

If the judgment result in act S33 is negative (no), the automatic assigning process proceeds to act S35. In act S35, the node is assigned as an intermediate node of this level of TCM. The process may proceed to act S36.

If the judgment result in act S33 is positive (yes), the automatic assigning process proceeds to act S34. In act S34, the node is assigned as a sink node of this level of TCM. The process may proceed to act S36.

In this example, node B does not belong to another operator for TCM1 corresponding to operator 1, and it is supposed that the fiber between nodes B and C belongs to operator 1, so node B is assigned as an intermediate node of TCM1.

In act S36, it is judged (determined) whether there is any other level of TCM assigned for the node.

In act S36, if there is any other level of TCM, the process proceeds to act S33. If there is no other level of TCM, the process proceeds to act S37. In this example, there is TCM2 assigned to operator 3 for node B. Accordingly, the process proceeds to act S33. The node B does not belong to another operator for TCM2 applied to operator 3, so node B is assigned as an intermediate node of TCM2.

In act 37, it is judged (determined) whether the node is the sink node of the traffic. If yes, the process proceeds to act S38. In act S38, the node is assigned as the sink node of each level of TCM for which the source node has been assigned while the sink node has not been assigned. If the node is not the sink node of the traffic, the process proceeds to act S31, the process is repeated, until each sub-network involved in a traffic trail is assigned a level of TCM, and the source node, intermediate node(s) and sink node of each level of TCM are known.

In this example, the next node of node B on the traffic trail is node C. Node C belongs to another operator for TCM1 applied to operator 1. Accordingly, node C is assigned as the sink node of TCM1 according to acts S33 and S34. At node C, the traffic enters a new operator, for example, operator 2. A minimum level of leisure TCM available, for example, TCM1, is assigned to be applied to operator 2, and node C serves as the source node of TCM1 applied to operator 2. Node C does not belong to another operator for TCM2 applied to operator 3, so node C is assigned as an intermediate node of TCM2 applied to operator 3.

Similarly, node H does not belong to another operator for TCM1 applied to operator 2, so node H is assigned as an intermediate node of TCM1 applied to operator 2. Node H does not belong to another operator for TCM2 applied to operator 3, so node H is assigned as an intermediate node of TCM2 applied to operator 3.

Similarly, node M does not belong to another operator for TCM2 applied to operator 3, and the fiber between nodes M and N also belongs to operator 3, so node M is assigned as an intermediate node of TCM2 applied to operator 3 according to acts S33 and S35. Node M belongs to another operator for TCM1 applied to operator 2, so node M is assigned as the sink node of TCM1 applied to operator 2 according to acts S33 and S34. At node M, the traffic enters a new operator, for example, operator 6. A minimum level of leisure TCM available, for example, TCM1, is assigned to be applied to operator 6, and node M serves as the source node of TCM1 applied to operator 6.

Similarly, node N belongs to another operator for TCM2 applied to operator 3, so node N is assigned as the sink node of TCM2 applied to operator 3. At node N, the traffic enters a new operator, for example, operator 5. A minimum level of leisure TCM available, for example, TCM2, is assigned to be applied to operator 5, and node N serves as the source node of TCM2 applied to operator 5. Node N does not belong to another operator for TCM1 applied to operator 6, so node N is assigned as an intermediate node of TCM1 applied to operator 6.

Similarly, node S does not belong to another operator for TCM1 applied to operator 6, so node S is assigned as an intermediate node of TCM1 applied to operator 6. Node S does not belong to another operator for TCM2 applied to operator 5, so node S is assigned as an intermediate node of TCM2 applied to operator 5.

Similarly, node X does not belong to another operator for TCM1 applied to operator 6, but the fiber between nodes X and Y belongs to another operator, for example, operator 5, so node X is assigned as the sink node of TCM1 applied to operator 6. In addition, node X does not belong to another operator for TCM2 applied to operator 5, so node X is assigned as an intermediate node of TCM2 applied to operator 5.

Similarly, node Y does not belong to another operator for TCM2 applied to operator 5, so node Y is assigned as an intermediate node of TCM2 applied to operator 5.

In act S37, node Y is determined to be the sink node of the traffic, so in act S38 node Y is assigned as the sink node of TCM2 to which the sink node has not been assigned. Instead of assigning node Y as an intermediate node of TCM2 applied to operator 5 as described above, node Y is assigned as the sink node of TCM2 applied to operator 5.

According to the above described automatic assigning process, a different-level-TCM assigning table for traffic 1 as shown in Table 3 below is obtained.

TABLE 3

Different-Level-TCM Assigning Table for Traffic 1

| TCM level | Source node | Intermediate node | Sink node | Operator identifier |
|---|---|---|---|---|
| TCM1 | A | B | C | Operator 1 |
| TCM2 | A | BCHM | N | Operator 3 |
| TCM1 | C | | M | Operator 2 |
| TCM1 | M | NS | X | Operator 6 |
| TCM2 | N | SX | Y | Operator 5 |

The TCM assigning process for traffic 1 as shown in Table 2 has been described above. A TCM assigning process for, for example, traffic 2 as shown in Table 2 will be described below.

For traffic 2 (using a trail after protection switching or after repairing) as shown in Table 2, different levels of TCM may be assigned by a network manager of a user, or may be automatically assigned by the system according to the conditions of sub-networks of different operators. Different levels of TCM may be automatically assigned by the system after a repairing action. Table 4 is an assigning table for assigning different levels of TCM to traffic 2. The automatic assigning process for traffic 2 is similar to that for traffic 1, and will not be repeated herein, supposing that the fiber between nodes F and K belongs to operator 1, the fiber between nodes L and G belongs to operator 6, the fiber between nodes B and C belongs to operator 1, the fiber between nodes H and M belongs to operator 2, and the fiber between nodes W and X belongs to operator 5.

TABLE 4

Different-Level-TCM Assigning Table for Traffic 2

| TCM level | Source node | Intermediate node | Sink node | Operator identifier |
|---|---|---|---|---|
| TCM1 | A | F | K | Operator 1 |
| TCM2 | A | FKLGB | C | Operator 3 |
| TCM1 | K |  | L | Operator 4 |
| TCM1 | L |  | G | Operator 6 |
| TCM1 | G | B | C | Operator 1 |
| TCM1 | C | DIH | M | Operator 2 |
| TCM2 | H | MRQV | W | Operator 3 |
| TCM1 | M | RQVW | X | Operator 6 |
| TCM3 | Q | V | W | Operator 4 |
| TCM1 | X |  | Y | Operator 5 |

For the application of a certain level of TCM, the TCM mode of source function at the source node of the TCM may be specified as Operational mode, the TCM mode of source function and sink function at an intermediate node of the TCM may be specified as Transparent mode, and the TCM mode of sink function at the sink node of the TCM may be specified as Monitor mode.

Referring back to act 230, as shown in FIG. 2, when some nodes in the network have faults (such as degradation), different levels of TCM involved in the end-to-end traffic send warning information and performance information. A network management unit receives and processes the warning information. The fault and performance of TCM may be obtained by monitoring Bit Interleaved Parity (BIP-8) overhead of the TCM and payload of Optical Data Unit (ODU). The Path Monitoring (PM) fault and performance to be described below may be obtained by monitoring BIP8 overhead of PM and payload of ODU. In the embodiment, when warnings are issued from multiple different levels of TCM, the network management unit analyzes in conjunction with the operator sub-network composing table, the traffic trail table, the TCM assigning table, the performance of each level of TCM, and the PM fault and performance at the source node of each level of TCM, to obtain a possible fault section (i.e. to locate fault section), and reports the analyzing result (the possible fault section) and procedure to the user. An analyzing process after receiving the warning information reported from different levels of TCM will be described below in conjunction with, for example, Table 3 and Table 4.

For Table 3, in the Case that the Traffic Uses the Normal Trail:

Supposing that TCM1 applied to operator 1 and TCM2 applied to operator 3 issue BIP8 Degradation (DEG) warnings at the same time, as shown in Table 3, the application scope of TCM1 is within that of TCM2. The monitored coverage scope of TCM1 applied to operator 1 is overlapped with that of TCM2 applied to operator 3. The overlapped portion is the whole monitored coverage scope of TCM1 applied to operator 1. Accordingly, if a fault occurs within the scope of TCM1, related warnings may detect at both of TCM1 and TCM2 at the same time. So the related warning of TCM1 applied to operator 1 is associated with that of TCM2 applied to operator 3. There may be a possibility that fibers of multiple points are degraded (for example, between nodes A and B and between nodes C, H, and M) and causes TCM1 and TCM2 to issue warnings at the same time. An analysis of BIP8-related performance may be required. The error condition of BIP8 of TCM2 reported after experiencing the degradation between nodes A, B and C and the degradation between nodes C, H and M may be much more severe than that of BIP8 of TCM1 reported after experiencing the degradation between nodes A and B.

Table 5 shows an analysis conclusion when TCM1 applied to operator 1 and TCM2 applied to operator 3 issue warnings at the same time. When TCM2 applied to operator 3 issues a BIP8 DEG warning in the meantime when TCM1 applied to operator 1 issues a BIP8 DEG warning, if there is a small difference between the degradation condition indicated by BIP8-related performance of TCM1 and that indicated by BIP8-related performance of TCM2, the fault position may be between nodes A and B. If the degradation condition indicated by BIP8-related performance of TCM2 is more severe than that indicated by BIP8-related performance of TCM1, faults may have been occurred between nodes A and B and between nodes B, C, H, and M.

TABLE 5

Analysis Conclusion when TCM1 applied to operator 1 and TCM2 applied to operator 3 Issue Warnings at the same time

| TCM warnings presented at the same time | BIP8 performance | Possible fault section |
|---|---|---|
| TCM1 BIP8 DEG of operator 1 and TCM2 BIP8 DEG of operator 3 | TCM2 is more degraded than TCM1 | Between nodes ABC and between nodes CHMN |
|  | TCM2 is similar to TCM1 | Between nodes ABC |

Supposing that TCM1 applied to operator 6 and TCM2 applied to operator 5 issue BIP8 Degradation (DEG) warnings at the same time, as shown in Table 3, a trail through which the traffic 1 passes operator 6 is overlapped with a trail through which the traffic 1 passes operator 5, for example, at a section passing nodes N, S and X. For example, if the section passing nodes N, S and X has a fault, related warnings can be detected at both of TCM1 and TCM2. Practically there may be a possibility that fibers of multiple points are degraded (for example, between nodes M and N and between nodes X and Y) and causes TCM1 and TCM2 to issue warnings at the same time. TCM1 may reflect the degradation condition between nodes M and N, but can not reflect the degradation condition between nodes X and Y. TCM2 may reflect the degradation condition between nodes X and Y, but can not reflect the degradation condition between nodes M and N. If a BIP8 DEG warning is detected at PM of source node N of TCM2, it is indicated that the fiber between nodes M and N may be degraded. If BIP8 performance of TCM2 is more degraded than that of TCM1, it is indicated that the fiber between nodes X and Y may be degraded. If no BIP8 DEG warning is detected at PM of source node N of TCM2, it is indicated that the fiber between nodes M and N is not degraded. In such a case, if BIP8 performance of TCM2 is more degraded than that of TCM1, it is indicated that the fault section may be between nodes N, S and X and between nodes X and Y. Otherwise, the fault section may be between nodes N, S and X. Table 6 shows an analysis conclusion when TCM1 applied to operator 6 and TCM2 applied to operator 5 issue warnings at the same time.

TABLE 6

| TCM warnings presented at the same time | PM of source node (N) of TCM2 | BIP8 performance | Possible fault section |
|---|---|---|---|
| TCM1 BIP8 DEG of operator 6 and TCM2 BIP8 DEG of operator 5 | Having BIP8 DEG warning | TCM2 is more degraded than TCM1 | Between nodes MN, between nodes NSX and between nodes XY |
|  | Having BIP8 DEG warning | TCM1 is more degraded than TCM2 | Between nodes MN, and between nodes NSX |

TABLE 6-continued

| TCM warnings presented at the same time | PM of source node (N) of TCM2 | BIP8 performance | Possible fault section |
|---|---|---|---|
| | No BIP8 DEG warning | TCM2 is more degraded than TCM1 | between nodes NSX, and between nodes XY |
| | No BIP8 DEG warning | TCM2 is similar to TCM1 | between nodes NSX |

For Table 4, in the Case that the Traffic Uses a Trail after Protection Switching or after Repairing:

Supposing that TCM2 applied to operator 3 and TCM1 applied to operator 6 issue BIP8 Degradation (DEG) warnings at the same time, as known from Table 4, a trail through which traffic 2 passes operator 3 is overlapped with a trail through which traffic 2 passes operator 6, for example, at a section passing nodes M, R, Q, V, and W. For example, if the section passing nodes M, R, Q, V, and W has a fault, related warnings can be detected at both of TCM1 and TCM2. Table 7 shows an analysis conclusion when TCM2 applied to operator 3 and TCM1 applied to operator 6 issue warnings at the same time.

Supposing that TCM2 applied to operator 3, and TCM1 applied to operator 6, as well as TCM3 applied to operator 4 issue BIP8 Degradation (DEG) warnings at the same time, as shown in Table 4, a trail through which traffic 2 passes operator 3, a trail through which traffic 2 passes operator 6, and a trail through which traffic 2 passes operator 4 are overlapped at a section passing nodes Q, V and W. For example, if the section passing nodes Q, V and W has a fault, related warnings may be detected at TCM1, TCM2 and TCM3 at the same time. The warning of TCM2 applied to operator 3, the warning of TCM1 applied to operator 6 and the warning of TCM3 applied to operator 4 are associated with each other. Practically there may be a possibility that fibers of multiple points are degraded and causes TCM1, TCM2 and TCM3 to issue warnings at the same time. An analysis of BIP8-related performance as well as BIP8 fault and BIP8 performance of PM at ingresses of TCM1 and TCM3 is required. Table 8 shows an analysis conclusion when TCM2 applied to operator 3,

TABLE 7

| TCM warnings presented at the same time | PM of source node (M) of TCM1 | BIP8 performance | Possible fault section |
|---|---|---|---|
| TCM2 BIP8 DEG of operator 3 and TCM1 BIP8 DEG of operator 6 | Having BIP8 DEG warning | TCM1 is more degraded than TCM2 | Between nodes HM, between nodes WX, and between nodes MRQVW |
| | Having BIP8 DEG warning | TCM2 is more degraded than TCM1 | Between nodes HM, and between nodes MRQVW |
| | No BIP8 DEG warning | TCM1 is more degraded than TCM2 | between nodes WX, and between nodes MRQVW |
| | No BIP8 DEG warning | TCM1 is similar to TCM2 | between nodes MRQVW |

TCM1 applied to operator 6 and TCM3 applied to operator 4 issue warnings at the same time.

TABLE 8

| TCM warnings presented at the same time | PM of source node (M) of TCM1 | BIP8 performance warning of PM at source node (Q) of TCM3 | BIP8 performance | Possible fault section |
|---|---|---|---|---|
| TCM2 BIP8 DEG of operator 3 and TCM1 BIP8 DEG of operator 6 and TCM3 BIP8 DEG of operator 4 | Having BIP8 DEG warning | More severe than that at M | TCM1 is more degraded than TCM2 | Between HM, between MRQ, between WX, and between QVW |
| | Having BIP8 DEG warning | More severe than that at M | TCM2 is more degraded than TCM1 | Between HM, between MRQ, and between QVW |
| | Having BIP8 DEG warning | Similar to that at M | TCM1 is more degraded than TCM2 | Between HM, between WX, and between QVW |
| | Having BIP8 DEG warning | Similar to that at M | TCM2 is more degraded than TCM1 | Between HM, and between QVW |
| | No BIP8 DEG | Having BIP8 DEG warning | TCM1 is more degraded than | Between MRQ, between WX, and |

TABLE 8-continued

| TCM warnings presented at the same time | PM of source node (M) of TCM1 | BIP8 performance warning of PM at source node (Q) of TCM3 | BIP8 performance | Possible fault section |
|---|---|---|---|---|
| | warning | | TCM2 | between QVW |
| | No BIP8 DEG warning | Having BIP8 DEG warning | TCM2 is more degraded than TCM1 | Between MRQ, and between QVW |
| | No BIP8 DEG warning | No BIP8 DEG warning | TCM1 is more degraded than TCM2 | Between WX, and between QVW |
| | No BIP8 DEG warning | No BIP8 DEG warning | Degradation of TCM1, TCM2 and TCM3 is similar | Between QVW |

As shown in Table 5 to Table 8, act 230 monitors the overlapping relationship between the coverage scopes and the performance degradation of different levels of TCM according to the warnings of different levels of TCM, to locate fault section(s). It should be noted that the located fault section(s) provides a smaller searching scope for the user to locate the particular position(s) of fault(s).

Referring back to FIG. 2, in act 240, a dependency analysis result of warnings of different levels of TCM and the analysis procedure are reported to the user, to assist the user to locate more accurately and solve problems. Some warnings may be suppressed. In one embodiment, the information of Table 5 to Table 8 is reported to the user. Related information (such as warning and performance information) of different levels of TCM, at which the warnings are reported at the same time, and corresponding location information of fault section are reported to the user.

For example, some warnings may be suppressed according to the analysis result, if a definite conclusion may be reached. Warning suppression between different levels of TCM may be done according to the location information of fault section and the overlapping relationship between the monitored coverage scopes of different levels of TCM.

The warning suppression is required to comply with certain rules. For nested or overlapping mode applied to different levels of TCM (for example, applied to TCM1 of nodes A, B and C and applied to TCM2 of nodes A, B, C, H, M and N) the warning suppression is possible. For cascaded mode applied to different levels of TCM (for example, applied to TCM1 of nodes A, B and C and applied to TCM2 of nodes N, S, X and Y), the warning suppression is not executed. For the same level of TCM applied to different segments (for example, TCM1 of nodes A, B and C and TCM1 of nodes C and M), the warning suppression is not executed. An upstream overlapped portion suppresses a downstream overlapped portion according to the direction of traffic flow. An overlapped portion having less nodes suppress an overlapped portion having more nodes according to the nodes on the trail.

In an overlapped portion, a relatively low level of TCM suppresses a relatively high level of TCM according to the assigned different levels of TCM.

For example, as shown in Table 5, if the fault section is determined to be between nodes A, B, and C, the warning of TCM1 may be used to suppress the warning of TCM2. The dependency analysis of TCM warnings may be triggered by the user. Warning suppression may also be enabled or disabled by the user. For example, disabling may be the default state. The warning suppression may be implemented in a network management unit and optical network equipment.

In one embodiment, an apparatus for processing warnings of different levels of TCM is provided. The apparatus may be implemented on a network management device by using software and related hardware. It should be noted that the apparatus embodiment has a number of technical features same as or corresponding to those of the method embodiment. These same or corresponding technical features are briefly described herein, and will not be repeated in detail.

Figure 4:
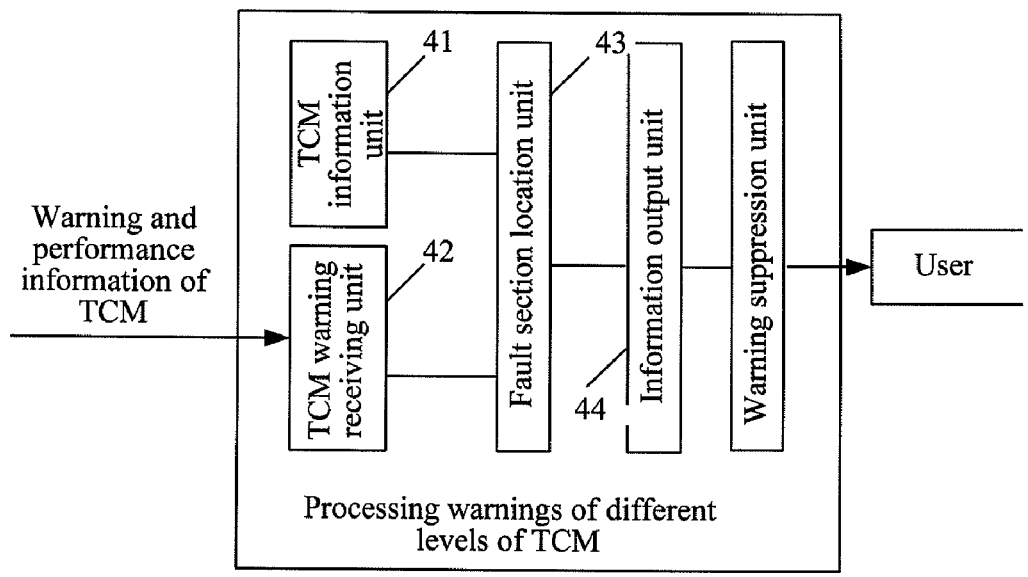
FIG. 4 is a diagram illustrating the structure of an apparatus for processing fault dependency of different levels of tandem connection monitoring.

FIG. 4 is a diagram illustrating the structure of an apparatus for processing warnings of different levels of TCM according to one embodiment. Referring to FIG. 4, the apparatus according to the embodiment includes a TCM information unit 41, a TCM warning performance receiving unit 42, a fault section location unit 43 and an information output unit 44. The units of the apparatus are described below according to the principle of the apparatus according to the embodiment.

The TCM information unit 41 is adapted to provide information of monitored coverage scopes of different levels of TCM. Particularly, the TCM information unit 42 may include an operator network composing information subunit, a traffic trail information subunit and a TCM assigning information subunit. By using the information subunits, the information of monitored coverage scope of TCM applied to a certain operator may be obtained. The information of monitored coverage scope of TCM includes source node, intermediate node(s) and sink node of the TCM (as shown in Table 3 and Table 4).

The TCM warning performance receiving unit 42 is adapted to receive warnings and performance information from different levels of TCM, and report to the fault section location unit 43 when warnings from at least two different levels of TCM are discovered. The fault section location unit 43 locates fault section according to the information provided by the TCM information unit 41 and the TCM warning performance receiving unit 42.

The fault section location unit 43 locates the fault section according to overlapping relationship between monitored coverage scopes of different levels of TCM, at which warnings are reported, provided by the TCM information unit 41, and performance degradation degree relationship between different levels of TCM, at which warnings are reported, provided by the TCM warning performance receiving unit 42.

After the fault section location unit 43 locates the fault section, the information output unit 44 outputs location-related information, provided by the fault section location unit 43, to a user. The location-related information includes at least the located fault section, optionally, further includes warnings and performance information of different levels of TCM at which warnings are reported.

When the monitored coverage scopes of different levels of TCM are known, if warnings are reported in at least two different levels of TCM, the fault section(s) may be located according to the overlapping relationship between the monitored coverage scopes of the at least two different levels, at which warnings are reported, and the degradation degree relationship of performances of the at least two different levels of TCM at which warnings are reported. The information related to the different levels of TCM, at which warnings are reported, and the fault section information (e.g., as shown in Table 5) is reported to the user. The located fault(s) section may be a possible fault section(s), and may serve as the basis of a further accurate fault location to be done by the user.

A user may directly know the possible fault section(s) when warnings are reported at different levels of TCM. The user is provided with a reference for further analysis of fault location. The user needs only to analyze based on the possible fault section(s) provided by the system. Accordingly, it takes less time for the user to locate the fault(s). In comparison, in an existing method for processing warnings of different levels of TCM, a user is required to analyze the possible fault sections from various complicated warning information, to reduce the fault sections act by act, and find the particular fault position. It is apparent that it takes a lot of time for the user to locate a fault.

Figure 5:
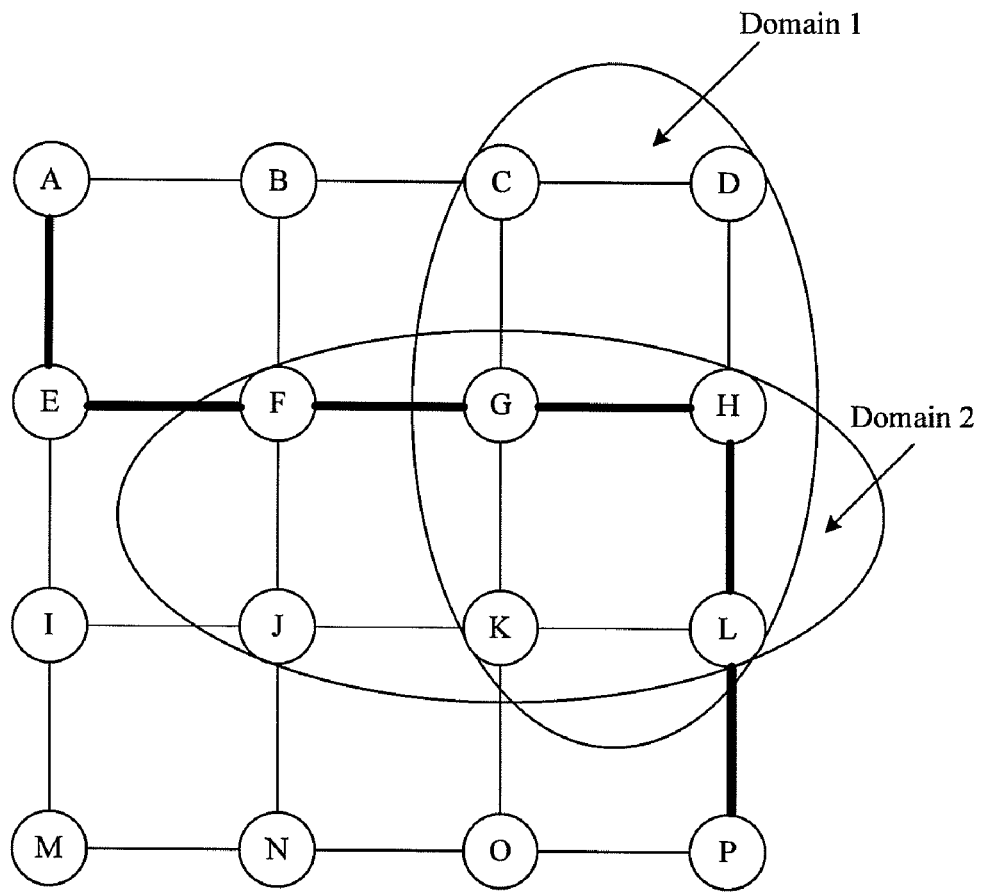
FIG. 5 is a schematic diagram of a networking by which the causes of an incorrectly-done warning suppression in the prior art are illustrated.

Furthermore, a warning suppression may be correctly performed between different levels of TCM, according to the location information of fault section(s) and the overlapping relationship between the monitored coverage scopes of different levels of TCM. Therefore, a risk of forming warning storm when the network has a fault may be avoided in some degree. In comparison, in the existing warning suppression of different levels of TCM, a warning suppression may be done incorrectly because the conditions of sections to which the different levels of TCM are applied are not taken into consideration. FIG. 5 is a schematic diagram of a networking, by which the causes of an incorrectly-done warning suppression in the prior art is described below.

In Recommendation G.798 for device functional characteristics of OTN, the suppression relationship of warnings is described in the defection correlation of the termination sink functions of layers, the conditions for generating Server Signal Failure/Trail signal Failure (SSF/TSF) are described in the consequent actions of termination or adaptation functions of the layers. Within the path monitoring (PM), certain suppression relationship is present between different warnings.

At the termination sink function (ODUkT_TT_Sk) of TCM, CI-SSF is used as an input and a condition of defect correlation function. In a situation that sink function mode is the operating mode, A TSF may be generated and SSF is transferred to subsequent layers, the result of which is the defect correlation function that multiple levels of TCM affect each other by transferring of the SSF information.

As shown in FIG. 5, TCM1 is applied to FGHL, TCM2 is applied to GHL. For example, node L terminates TCM1 and TCM2. Supposing there is a configuration error in MI-TxTI of TCM1 and TCM2, and supposing that the functions of TCM2 are processed prior to those of TCM1, a TIM warning of TCM2 will be reported at node L. If the MI-TIMActDis at the termination sink function of TCM2 is configured to be enabled, a TSF is generated and SSF is transferred to subsequent layers. CI-SSF may be received at the sink function of TCM1, and serves as a condition for suppressing warnings of TCM1. Furthermore, the TIM warning of TCM1 is suppressed by that of TCM2. It is apparent that such suppression is incorrect. This will be further described in detail below.

In the case that a node terminates multiple levels of TCM, the source direction of each level of TCM has a respective level of adaptation source function (ODUkT/ODUk_A_So) and termination source function (ODUkT/ODUk_TT_So), the sink direction of each level of TCM has a respective level of adaptation sink function (ODUkT/ODUk_A_Sk) and termination sink function (ODUkT/ODUk_TT_Sk). The functions of multiple levels of TCM are processed in an order according to signal flow. For the sink function of a level of TCM processed later, the TSF/SSF information generated and transferred by the previously processed level of TCM is not used as a condition of warning suppression. Instead, the TSF/SSF information generated and transferred by other functions (e.g. OTUk_TT_Sk), except the previously processed level of TCM, may be used as the condition of warning suppression.

For example, in the networking as shown in FIG. 1, node C terminates two levels of TCM as follows, according to the assigning result of Table 4.

| TCM2 | A | FKLGB | C | Operator 3 |
| TCM1 | G | B | C | Operator 1 |

Figure 6:
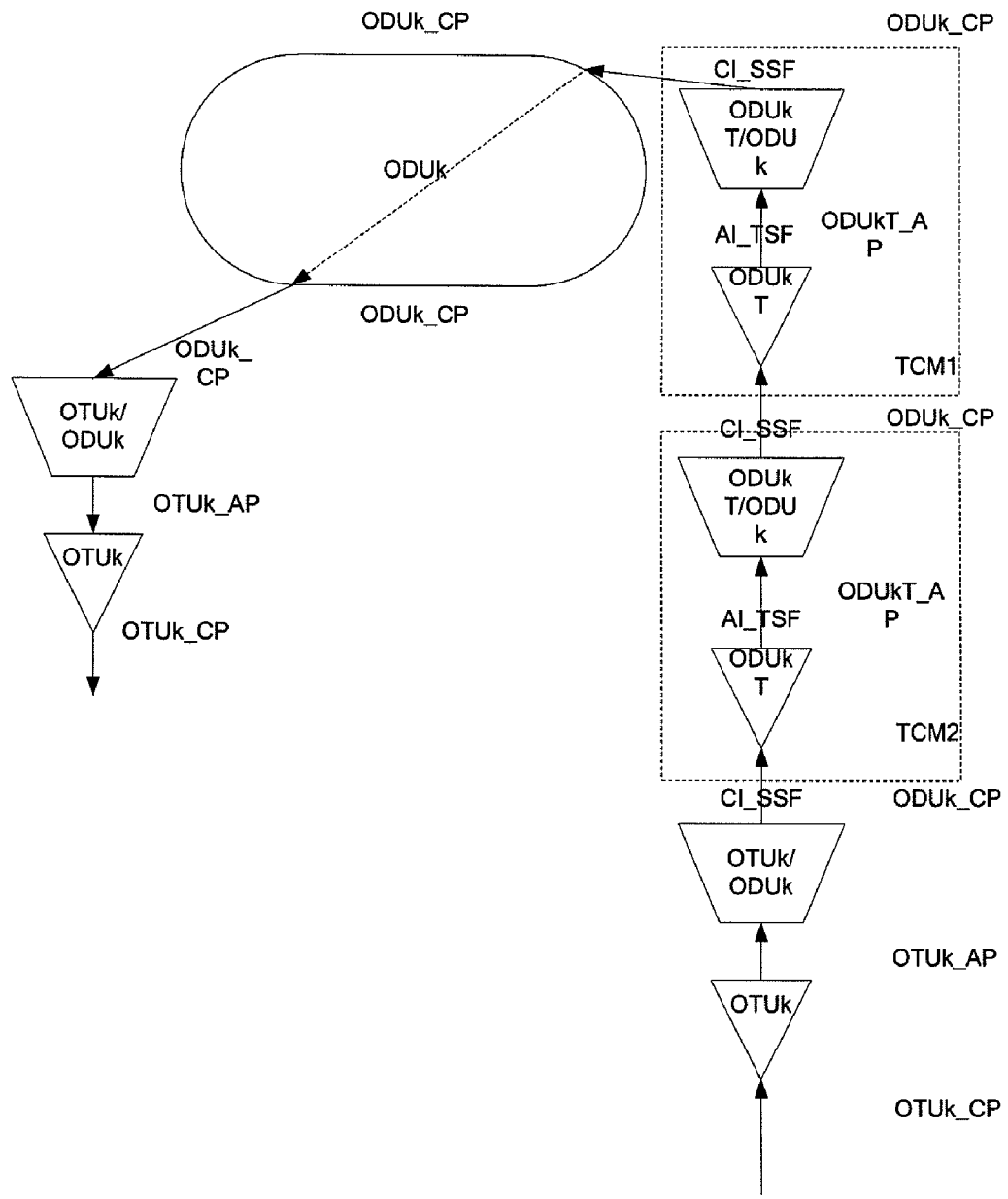
FIG. 6 is a schematic diagram illustrating a functionality model in which node C, as shown in the networking diagram of FIG. 1, terminates 2 levels of TCM.

The function model of node C is as shown in FIG. 6. Supposing the functions of TCM2 are executed prior to those of TCM1 according to the signal flow, then when the functions of TCM2 are executed, a TSF may be generated at the termination sink function (ODUkT_TT_Sk) of TCM2 or an SSF may be generated at the adaptation function (ODUkT/ODUk_A_Sk) of TCM2 and transferred to subsequent layers due to some defects of TCM2, TCM1 may receive the SSF transferred by TCM2, as described in the Recommendation G.798. The TCM2 may generate TSF at the termination function and then transfer SSF, or TCM2 may generate SSF at the adaptation function and transfer the SSF. Using, by TCM1, the SSF transferred in the above two cases as the input of defect correlation function may be incorrect. Alternatively, supposing the functions of TCM1 are executed prior to those of TCM2, similarly, using, by TCM2, SSF transferred by TCM1 as the input of defect correlation function may also be incorrect. SSF information transferred by a previously processed level of TCM can not be simply used as the condition of warning suppression. A synthesis analysis of information obtained from non-accessing monitoring of PM at source node of each level of TCM and the coverage scope of each level of TCM is required before a correct fault analysis of different levels of TCM. During warning suppression of different levels of TCM, SSF information generated and transferred by other functions (e.g. OTUk_TT_Sk) except a previously processed level of TCM may be used as a condition of the warning suppression. However, SSF information transferred after generating a TSF by a previously processed level of TCM or SSF information generated and transferred by the adaptation function of the previously processed level of TCM can not be used as the condition of the warning suppression.

As can be seen, the warning suppression of different levels of TCM according to the embodiments of the invention takes into consideration the monitored coverage scopes of different levels of TCM, instead of the simple utilization of SSF/TDF information transferred between different layers between different nodes. Therefore, the above mentioned incorrect suppression of warnings may be avoided.

What is claimed is:

1. A method for processing fault dependency of different levels of tandem connection monitoring, comprising:

obtaining monitored coverage scopes of the different levels of tandem connection monitoring (TCM); wherein the TCM is implemented in a network including sub-networks of a plurality of operators;

locating a fault section according to an overlapping relationship between monitored coverage scopes of the at least two different levels of TCM at which the warnings are reported and performance degradation degrees of the at least two different levels of TCM, the fault section being located when warnings are reported in at least two different levels of TCM;

outputting location-related information that includes information of the fault section to a user; and suppressing warnings between the at least two different levels of TCM according to the overlapping relationship between the monitored coverage scopes of the at least two different levels of TCM;

wherein when suppressing warnings between the at least two different levels of TCM, if a node terminates multiple levels of TCM, a sink function of a level of TCM does not use Server Signal Failure (SSF) information transferred by a previously processed level of TCM after generating a Trail Signal Failure (TSF).

2. The method according to claim 1, wherein obtaining the monitored coverage scopes of the different levels of TCM comprises:

obtaining networking information of each sub-network and information of traffic trail; and assigning the different levels of TCM according to the networking information and information of traffic trail, to obtain the monitored coverage scopes of the different levels of TCM.

3. The method according to claim 2, wherein assigning the different levels of TCM is performed automatically within system according to conditions of each sub-network.

4. The method according to claim 3, wherein assigning the different levels of TCM is includes automatically:

assigning a minimum level of TCM to be applied to an operator when entering a network of the operator at a node, wherein the node is a source node of the level of TCM;

determining a next node of the traffic trail;

judging whether the next node or a next fiber segment of the node belongs to another operator for a certain level of TCM;

assigning the node to be an intermediate node of the certain level of TCM if the node or the next fiber segment of the node does not belong to another operator;

assigning the node to be a sink node of the certain level of TCM if the node or the next fiber segment of the node belongs to another operator;

judging whether there is any other assigned level of TCM for the node;

judging whether the node is a sink node of a traffic if there is not any other assigned level of TCM for the node;

assigning the node to be a sink node of each level of TCM to which a source node has been assigned while a sink node has not been assigned.

5. The method according to claim 4, wherein the locating the fault section is performed according to performance warning information at a source node in monitored coverage scope of each level of TCM, in addition to the overlapping relationship and the performance degradation degrees.

6. The method according to claim 4, wherein judging whether there is any other assigned level of TCM for the node comprises:

judging whether the next node or a next fiber segment of the node belongs to another operator for a certain level of TCM;

assigning the node to be an intermediate node of the certain level of TCM if the node or the next fiber segment of the node does not belong to another operator; and assigning the node to be a sink node of the certain level of TCM if the node or the next fiber segment of the node belongs to another operator.

7. The method according to claim 3, wherein the location-related information further comprises warnings and performance information of the different levels of TCM.

8. The method according to claim 3, wherein the locating the fault section is performed according to performance warning information at a source node in monitored coverage scope of each level of TCM, in addition to the overlapping relationship and the performance degradation degrees.

9. The method according to claim 2, wherein the location-related information further comprises warnings and performance information of the different levels of TCM.

10. The method according to claim 2, wherein the locating the fault section is performed according to performance warning information at a source node in monitored coverage scope of each level of TCM, in addition to the overlapping relationship and the performance degradation degrees.

11. The method according to claim 1, wherein when suppressing warnings between the at least two different levels of TCM, if a node terminates multiple levels of TCM, a sink function of a level of TCM does not use SSF information generated and transferred by an adaptation function of the previously processed level of TCM as a condition of warning suppression.

12. The method according to claim 1, wherein the location-related information further comprises warnings and performance information of the different levels of TCM.

* * * * *